United States Patent [19]
Graf et al.

[11] Patent Number: 5,844,244
[45] Date of Patent: Dec. 1, 1998

[54] PORTABLE IDENTIFICATION CARRIER

[75] Inventors: Ulrich Graf, Winterthur; Johann Locher, Wetzikon, both of Switzerland

[73] Assignee: Kaba Schliesssysteme AG, Wetzikon, Switzerland

[21] Appl. No.: 788,384

[22] Filed: Jan. 24, 1997

[30] Foreign Application Priority Data

Feb. 1, 1996 [CH] Switzerland .......................... 00258/96

[51] Int. Cl.[6] .................................................. G06F 17/00
[52] U.S. Cl. ........................................... 235/375; 235/382
[58] Field of Search ..................................... 235/375, 382

[56] References Cited

U.S. PATENT DOCUMENTS

4,501,958  2/1985  Glize et al. ............................. 235/382

*Primary Examiner*—Harold Pitts
*Attorney, Agent, or Firm*—Spencer & Frank

[57] ABSTRACT

The contactless identification carrier which can be carried by a person and having access functions for particular areas, particularly skiing areas, is constructed as a separate, flat carrier element and is fixed in interchangeable, portable manner on a personal bracelet PA. The carrier element (1) contains a passive, integrated, electronic data carrier MI with processor, as well as an integrated antenna (2) surrounded by a dielectric (4) and a detachable fixing device (3). The antenna has partly open radiating surfaces FAO, which are not covered by electrically conductive parts of the personal bracelet PA. This gives a universally usable identification and access medium with very good comfort and convincing practical characteristics.

19 Claims, 7 Drawing Sheets

PORTABLE IDENTIFICATION CARRIER

BACKGROUND OF THE INVENTION

The invention relates to a contactless identification carrier which can be carried by a person and which has access functions for certain areas in accordance with the preamble of claim 1. Portable identification carriers are known for various uses and in various forms, e.g. as cards or keyrings, which can be carried by authorized persons.

As access authorization media to skiing areas it has already been proposed to use a card, which can be carried in the pocket of his suit by the skier in the form of a contactless ski pass, or as a ski pass watch, i.e. a special wrist watch with built in data carrier, which is valid as an access medium for a particular skiing area.

However, the hitherto known constructions suffer from serious disadvantages in practical use and are also very confined in their application. A serious disadvantage of contactless ski cards is that such cards can easily be forgotten and left in the pocket when changing clothes and consequently the access pass is no longer available when required. The ski pass watch represents the integration of the identification carrier into a special watch, which is complicated and involves additional costs, which also leads to significant limitations. A considerable proportion of potential users of a particular skiing area for which this ski pass watch is valid, do not like to be forced to also buy a watch with the ski pass. The ski pass watch is only usable for a particular area and only has an admission function for a specific time period and is subsequently not further used. In addition, many users do not wish to set aside their personal wristwatches and replace them by an obligatory ski pass watch. All the known proposals suffer from serious disadvantages, in that they undesirably restrict the user, in that the carrying or wearing comfort is impaired and the handling of the known identification carriers is often unpractical and inadequate as regards the operating range. In particular, there is a risk of forgetting the access pass when It is needed. In addition, a considerable percentage of skiers deliberately wear no watch or at least not during sporting activities, holidays and leisure time.

The problem of the invention is therefore to overcome these serious disadvantages and limitations and to create a universally usable, novel type of portable identification carrier, which in particular ensures that the access pass is not forgotten, when required in a specific use area. It must be as easy as possible to carry along and cause few problems as regards wearing comfort and handling. In addition, the access function must be easily and reliably implementable with random sports clothing and equipment and the identification carrier must also satisfy esthetic demands.

SUMMARY OF THE INVENTION

According to the invention this problem is solved by a identification carrier in the form of an additional carrier element according to claim 1. By fixing to a personal bracelet or strap PA and the interchangeability of the carrier element, it is ensured that the identification carrier is not forgotten and is instead carried by the person when it is needed. The personal bracelet is in most cases a wristwatch, but can also e.g. be an ornamental bracelet. In all cases it is in this way ensured that if the wearer wishes to change his personal bracelet or strap, e.g. a sports watch by an ornamental or decorative watch or a bracelet without watch for an evening out, that the clearly visible carrier element with the identification carrier is transferred to the new bracelet. This is unlike the situation with the known identification cards, which are often left behind in a pocket. With the detachable fixing device the flexible carrier element can be fixed at a random position to the personal bracelet, which makes it possible to fit the same in such a way that it corresponds in optimum manner to the personal wearing comfort requirements on the one hand and the handling for acquiring access on the other, because the data carrier positioned on the wrist can very easily be brought into the reading range of a reading antenna, unlike in the case of the known card in a random pocket. The large-area antenna surrounded by a dielectric permits considerable reading ranges, so that operation at access stations is greatly facilitated and made more fail-safe. The covering of the antenna with a dielectric provides an immunization with respect to environmental influences, particularly of the body on which the bracelet is worn, as well as any metal parts of the bracelet. This ensures a reliable operation of the identification carrier, also in the case of changed environmental conditions (e.g. different personal bracelets and different positions of the carrier element relative to the bracelet). The carrier element can be fixed and worn both on the bracelet and under the bracelet, or even laterally alongside the bracelet.

The dependent claims relate to advantageous further developments and variants of the invention with particularly suitable shapes, antennas, fixing devices and additional functions.

The concept of the personal bracelet PA means a bracelet in a relatively random form with or without a wristwatch, which can be replaced in accordance with the wishes and personal taste of the wearer. It is important that a personal bracelet is always carried and that to it is fixed the carrier element according to the invention with the data carrier MI and the antenna (as the identification carrier). This permits random changing of the personal bracelet PA in accordance with the wishes of the wearer without forgetting to transfer the carrier element to the new, personal bracelet. This makes it clear that the novel carrier element with data carrier is more universally usable than the hitherto known solutions.

BRIEF DESCRIPTION OF THE DRAWINGS

The invention is described in greater detail hereinafter relative to embodiments and the attached drawings, wherein show.

DESCRIPTION OF THE PREFERRED EMBODIMENT

Figure 1A:
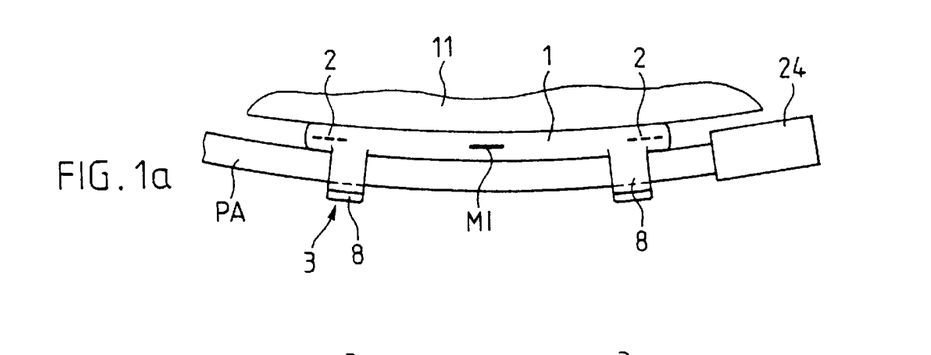
FIGS. 1a to c An identification carrier according to the invention with a separate carrier element with antenna and fixing device to a personal bracelet PA in three views.
Figures 1B, 1C:
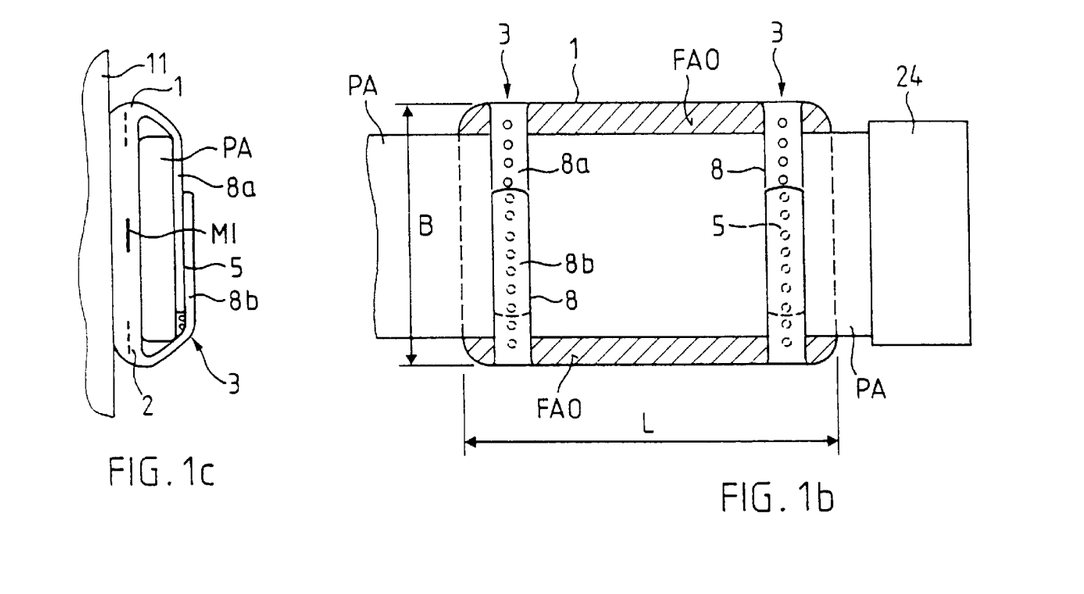

FIG. 1 shows in exemplified form an identification carrier according to the invention in three views 1a, 1b and 1c. The identification carrier is interchangeably fixed in a suitable position on a personal strap or bracelet PA, which is worn on the arm 11. The identification carrier comprises a separate, flat carrier element 1 and a detachable fixing device 3, which makes it possible to replace the personal bracelet PA. The carrier element 1 contains a passive, integrated, electronic data carrier MI with processor, electric circuit and data store, as well as an antenna 2, which is surrounded by a dielectric 4, here on both sides by a dielectric covering layer (as will be explained in conjunction with FIG. 3b). The antenna 2 has at least partly open antenna radiating surfaces FAO, which are covered by non-electrically conducting parts or electromagnetically impermeable material of the personal bracelet. Further illustrations in this connection are provided in the examples of FIGS. 13 to 15. For optimum adaptation to the rounding of the arm 11 and the bracelet, in this case the data carrier is slightly curved and is advantageously formed from a flexible material. The bending radius can be a few centimeters, e.g. 4 to 8 cm. The carrier element is here fixed in a favourable position alongside the bracelet clasp 24. The fixing device 3 is connected in one piece with the carrier element 1 and comprises two straps 8 with in each case facing, interconnectable ends 8a, 8b. The carrier element 1 is here fitted below the bracelet PA, i.e. between the arm 11 and the bracelet. The ends 8a, 8b surround the bracelet, so that they are closed together over the bracelet PA facing the arm 11. For this purpose is provided an easily releasable, but still securely retaining fastening 5, e.g. in the form of positive projections or pins on the end 8b, which engage in depressions or holes in the end 8a. The length of this fastening is adjustable in such a way that it can be adapted in optimum manner to different cross-sectional circumferences U of the personal bracelet PA and for this purpose complete rows of positive fastening elements are provided on the ends 8a and 8b.

Figure 2:
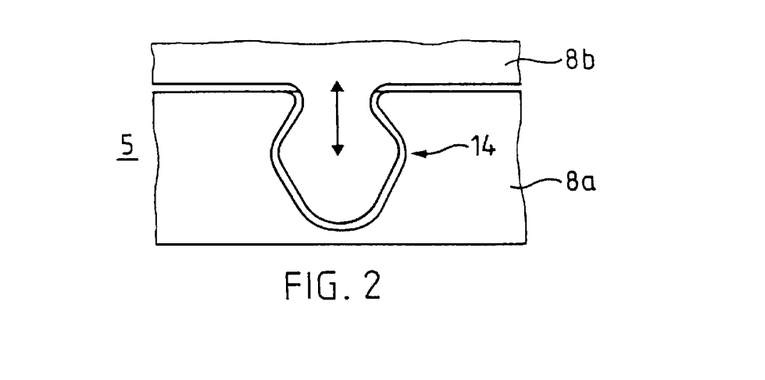
FIG. 2 An example of a positive fastening.

FIG. 2 illustrates an example of such a positive snap-action fastening 14. Pins or a rib running along the strap with this cross-sectional form is fitted to the strap part 8b. The matching positive depression in the form of a hole or longitudinal groove is located in the strap part 8a. Plastics are very suitable as materials for the fixing means 3 and for the carrier elements 1.

Figure 3A:
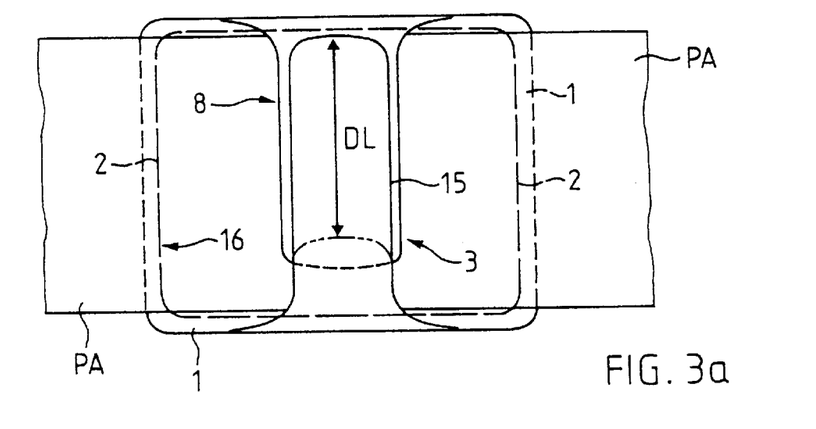
FIGS. 3a,b & 4 Examples of fixing devices with Velcro fastening.
Figure 3B:
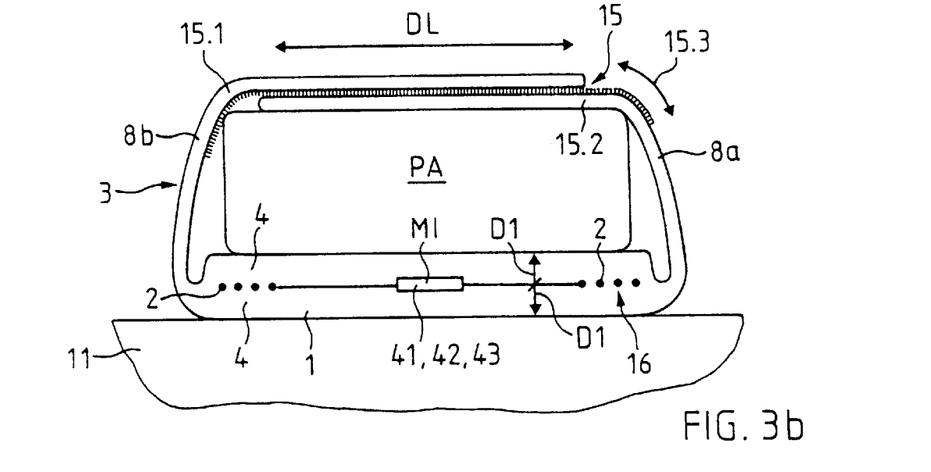
Figure 4:
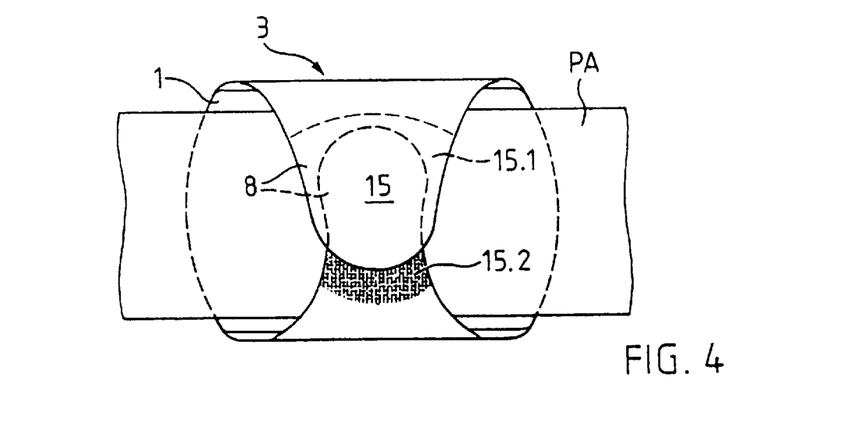

FIGS. 3 and 4 illustrate examples of fixing devices with Velcro fastenings 15. These examples have a central strap 8 with the two strap ends 8a and 8b, which are somewhat wider than the versions with two straps 8 (FIGS. 1 and 14) and which are widened towards the carrier element 1, so that the latter cannot turn when the Velcro fastening is closed. To the strap end 8a is fitted the loop part 15.2 of the Velcro fastening and the counterpart, i.e. the hook part 15.1, is located on the strap end 8b. The length of these two Velcro fastening parts 15.1 and 15.2 is chosen in such a way that it is possible to achieve a maximum fastening length change DL, adapting to bracelets PA of different sizes, i.e. corresponding to the cross-sectional circumference U thereof.

The Velcro fastening permits a particularly simple and practical replacement of the personal bracelet PA. With a suitable design as regards material and position of the two Velcro fastening parts 15.1 and 15.2, a reliable fastening can be obtained, which will not open under normal handling conditions. This fastening can be designed with a very limited thickness of e.g. only 1 to 1.5 mm and in particular can be made from transparent material, which does not influence the esthetics of the personal bracelet. In the case of a Velcro fastening comprising a hook part and a loop part, the hook side 15.1 must not be open to the outside, because otherwise it could hang on clothing, particularly knitwear. Therefore, preferably the loop side 15.2 should be directed outwards, to the extent that it can be partly open 15.3 (as a function of the length adaptation DL to the cross-sectional circumference U of the bracelet). The edges of the hook side 15.1 for pressing closed the fastening are here round and flat, so that they cannot be turned up.

In the view of FIG. 3b, in cross-section to the personal bracelet PA, the structure of the carrier element is shown with a data carrier MI, which contains a processor, an electric circuit and a data store, as well as a flat antenna 2, which can e.g. be applied to a printed circuit as a loop. On either side of the antenna is provided a covering with a dielectric 4 having a thickness D1 of e.g. preferably at least 0.5 mm and which can e.g. be 0.5 to 1 mm. This greatly reduces the effect on the antenna function of environmental influences of the arm 11 and metal parts, e.g. of the personal bracelet PA. Whereas the fixing device 3 in the example of FIG. 3 is directed at considerable length changes DL for adapting to wide bracelets PA, the example of FIG. 4 shows a Velcro fastening, which is more particularly suitable for smaller and average-size bracelets, where no particularly large length influence DL has to be compensated. In this case the two strap parts 8a and 8b can e.g. have an arcuate configuration and consequently, together with the carrier element 1, have a very rounded appearance, if this is desired.

Figure 5A:
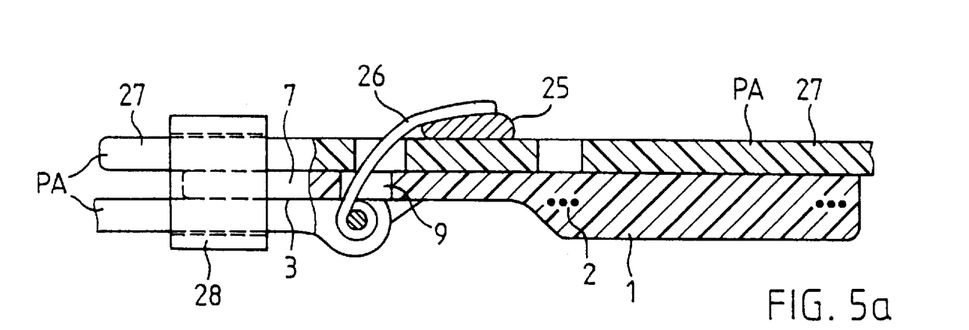
FIGS. 5a & b A carrier element with fixing device as an insert in a bracelet clasp.
Figure 5B:
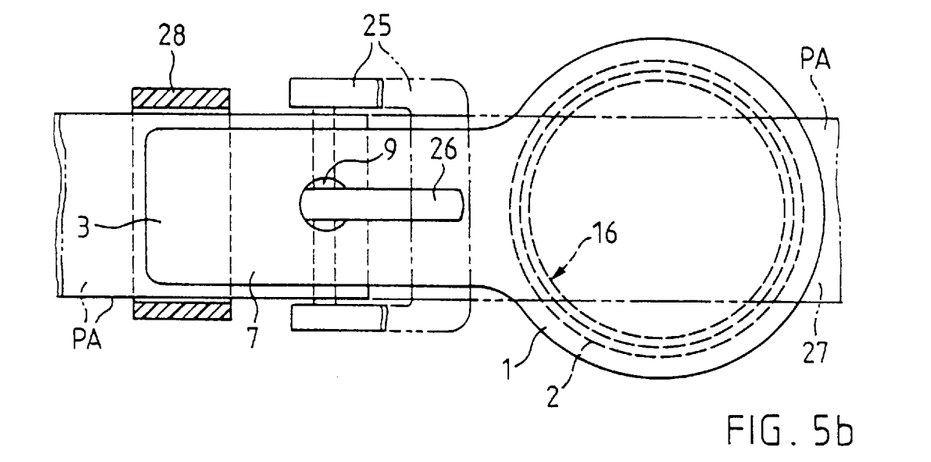

FIG. 5 shows an example in which the fixing device 3 cooperates with the personal bracelet PA. The carrier element 1 has an extension 7 with a hole 9 and in this way forms an insert, which can be fixed to a strap clasp 25 with the pin 26 of the bracelet. For this purpose the insert is passed through the clasp 25 and the pin 26 is fixed in the hole 9. The perforated strap part 27 of the bracelet PA is passed over the insert through the clasp 25 and fixed. The extension 7 is prevented from rotating by a holding band 28 of the bracelet. The carrier element 1 is in this way fixed in a favourable, comfortable wearing position to the bracelet, without any passing round holding bands being necessary. The fixing device 3 is here formed by the extension 7 with the hole 9 on the one hand and by the clasp 25 with pin 26 of bracelet PA on the other.

This construction is naturally only usable for bracelets having a pin and a clasp as the fastening, but this configuration is widespread. It has a very simple construction, permits free shaping and ensures a very reliable fixing. The resulting positioning of the carrier element 1 directly alongside the clasp is relatively comfortable and also practical for exercising the identification function.

Figure 6:
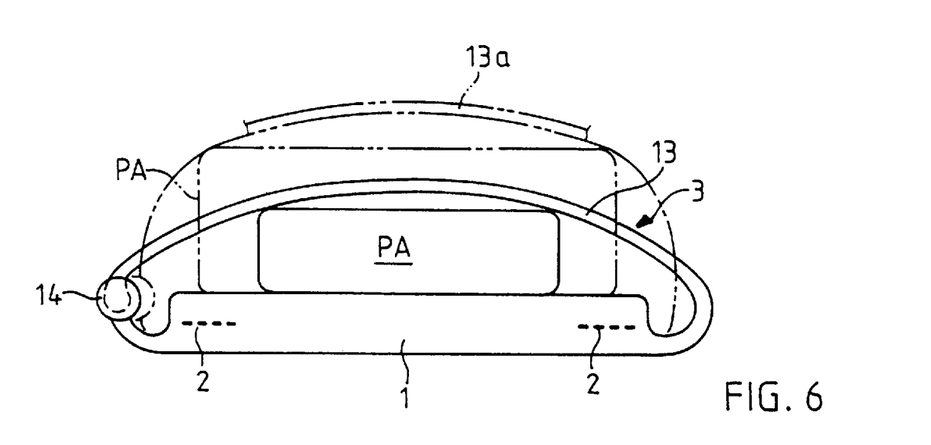
FIG. 6 A clip-like carrier element with fixing device.

FIG. 6 shows a construction in which the carrier element 1, together with the fixing device 3, forms a clip surrounding the bracelet PA. For this purpose the fixing device 3 is constructed as an elastic bow 13, which can adapt to different cross-sectional shapes and sizes of the bracelet. Once again a snap-action fastening 14 is provided for fixing purposes. An alternative position of the elastic bow on a larger bracelet is indicated at 13a.

Figure 7:
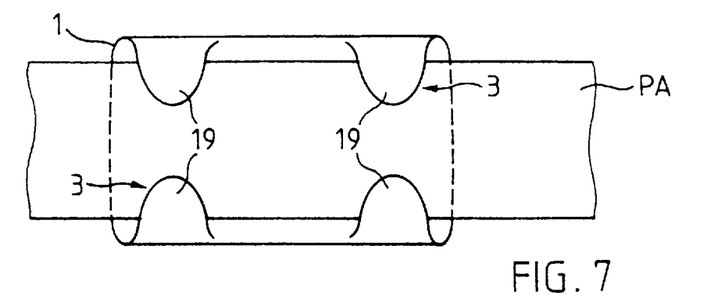
FIG. 7 A fixing device with flexible corner clips.

FIG. 7 illustrates a further fixing mode using four elastic tabs 19, which are built up as a fixing device at the corners of the carrier element. Thus, together with the tabs 19, the carrier element 1 forms an elastic clip, which can be engaged on the personal bracelet PA. This is a particularly simple construction for bracelets with a similar cross-section.

Figure 8A:
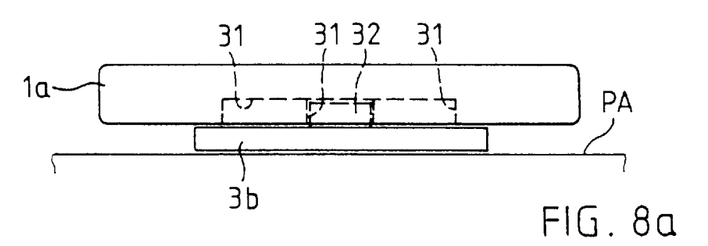
FIGS. 8a & b A two-part construction of carrier element and fixing device.
Figure 8B:
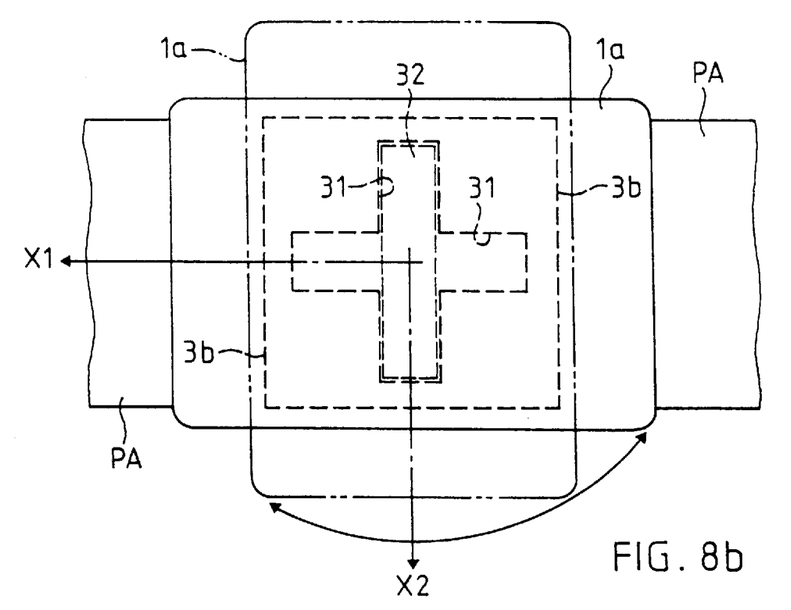

FIGS. 8a and b show a further development of the invention, in which the carrier element 1 and fixing device 3 are no longer in one piece, but are instead constructed as two separable and firmly joinable parts 1a, 3b. This two-part construction makes it possible to modify the relative position of the carrier element 1a and fixing device 3b with respect to one another and consequently fix rectangular carrier elements either transversely or longitudinally with respect to the bracelet, i.e. in direction X1 or X2 for adapting to bracelets PA of varying width. For fixing the carrier element 1a to the fixing device 3b a rib 32 is provided in one part and an associated cruciform, positive depression 31 in the other. It is also possible to use other matching, positive shapes in the carrier element and in the fixing device as engage-round snap-action or Velcro fastenings for fixing purposes.

For this longitudinal and transverse wearing construction it is particularly appropriate to use carrier elements, whose length L is preferably 20 to 40%, max 50% larger than the width B thereof.

Figure 9:
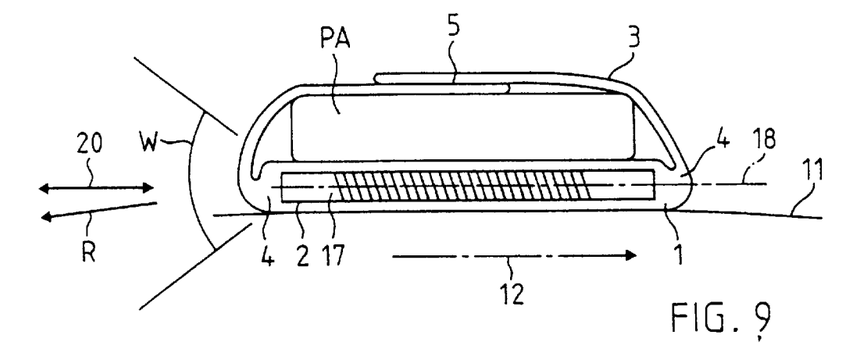
FIGS. 9 & 10 Examples of identification carriers with ferrite antennas.

FIG. 9 shows another variant of the invention with ferrite antennas in place of the hitherto described loop antennas. A flat ferrite rod 17 of thickness e.g. 2 to 3 mm with an electric winding is here shown with its axis 18 at right angles to the personal bracelet PA and also surrounded by dielectric material, particularly in the antenna radiation area W. The relatively large solid angle W, in which a coded communication 20 can take place by means of rf signals with an associated reading station is e.g. approximately 90°. The communication range R can be several decimetres, e.g. 30 to 60 cm. These values for W and R are also attained with the large-area, flat loop antennas. The communication in the axial direction 18 is here parallel to the axis 12 of the forearm 11. For exercising the identification function the arm is merely stretched out in the direction of a reading station. In the case of the flat antenna loops 16 (at Pu7 and Pu12 in FIG. 11a), the forearm is held tangentially to the reading station.

Figure 10:
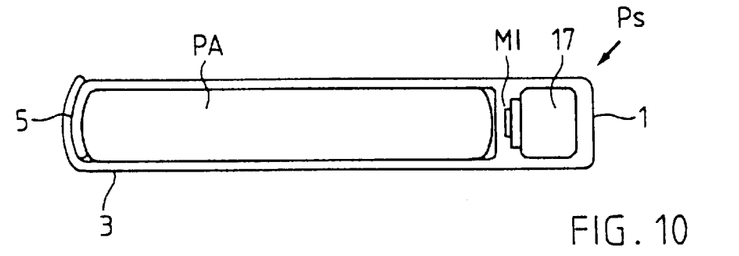

In the example of FIG. 10 a ferrite antenna 17 is fixed laterally alongside the personal bracelet PA. The fixing device 3 with fastening 5 and carrier element 1 surrounding the bracelet provide a very flat and compact shape. The lateral wearing position is designated Ps.

Figure 11A:
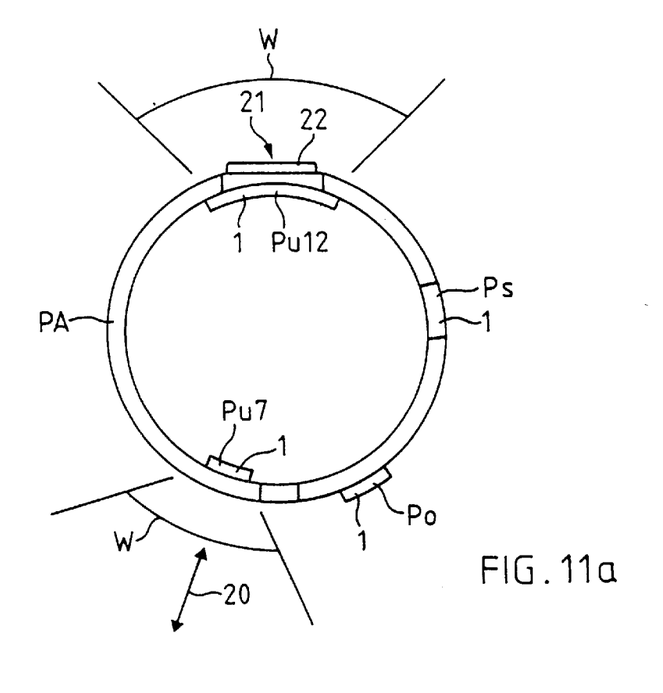
FIGS. 11a & b Different possible positions of the identification carrier relative to the personal bracelet PA and the arm.
Figure 11B:
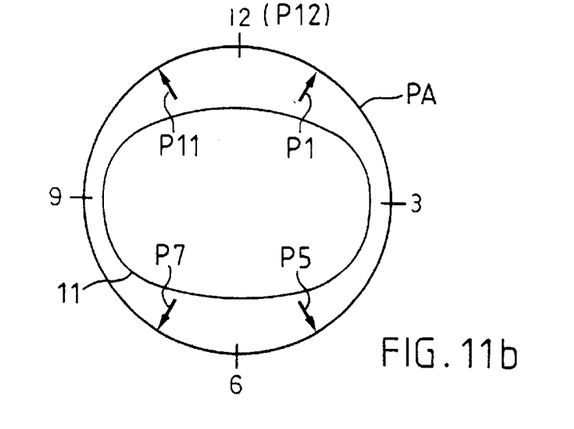

FIGS. 11a and b illustrate the multiplicity of possible positions in which the carrier element 1 can be fixed to the personal bracelet PA in accordance with the wishes of the wearer. FIG. 11a e.g. shows different positions with respect to the bracelet PA:

Pu=position below the bracelet,
Po=position on the bracelet,
Ps=position laterally alongside the bracelet.

For example, the solid angle W for the coded rf communication 20 with a reading station is shown.

FIG. 11b illustrates the position with respect to the arm 11. This is given by clock hand positions, in which P12 (at the 12 o'clock position) indicates the top of the wrist joint. Favourable fixing positions are e.g. in the flat area at the top from 11 to 1 o'clock (P11 to P1) and at the bottom, e.g. from 5 to 7 o'clock (P5 to P7).

In exemplified manner FIG. 11a shows a position Pu12, where the carrier element 1 is fixed below a glass 22 of a wristwatch 21 (cf. FIG. 14).

Figure 12:
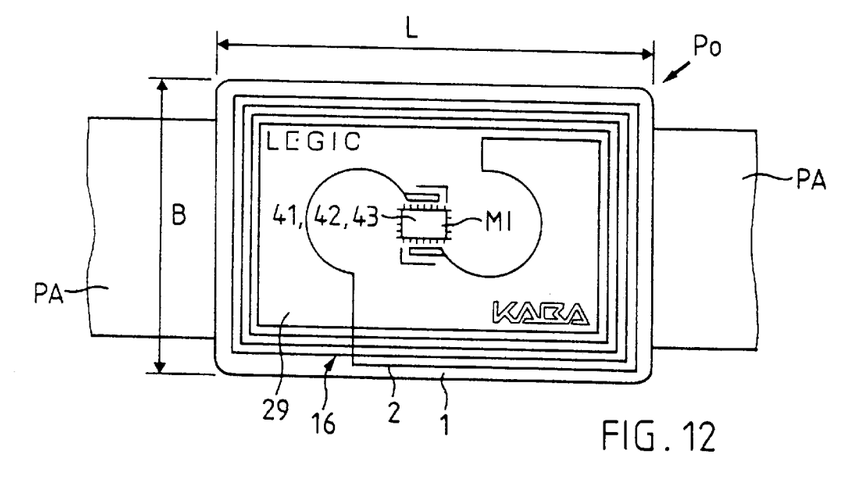
FIG. 12 A transparent design of the identification carrier positioned on the bracelet.

FIG. 12 shows an example in a transparent design 29 of the carrier element 1, which is carried and fixed on the personal bracelet PA (position Po). It is possible to see the internal electrical structure together with the data carrier MI (chip), connecting lines and antenna loops 16. This constitutes an attractive, modern electronic design, in which the identification function is made quasi-visible.

Figure 13:
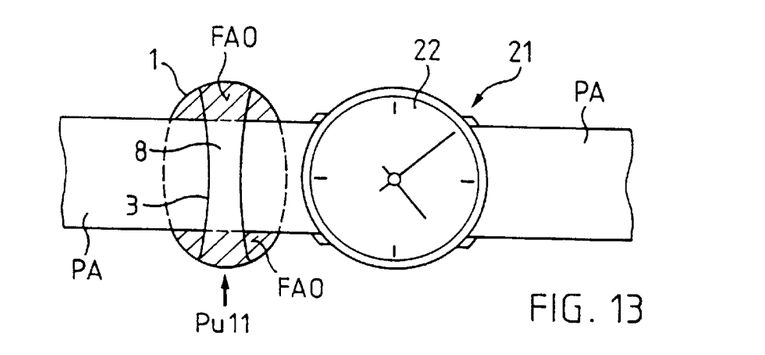
FIGS. 13 & 14 Examples of identification carriers on wristwatches.
Figure 14:
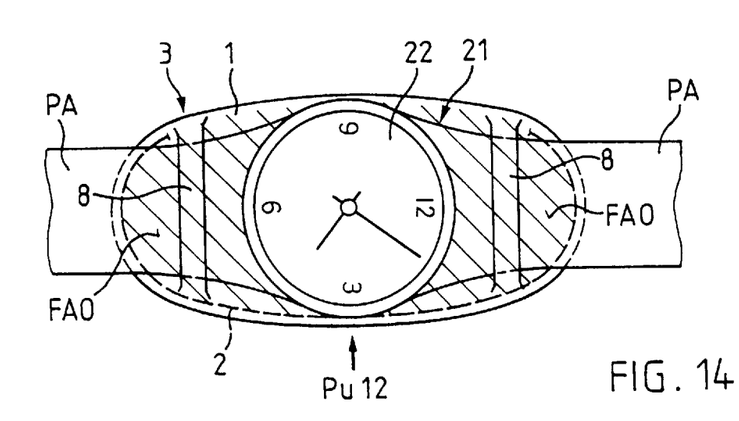

FIGS. 13 and 14 show examples with wristwatches 21 as a personal bracelet PA, in which the carrier element 1 is fitted in the vicinity of the glass 22. The design form can be in accordance with the desired glasses and e.g. for round glasses have a correspondingly rounded external shape. In FIG. 13 the carrier element 1 is located e.g. in a position Pu11 below the bracelet and alongside the glass 22 and is fixed with a strap 8 as the fastening device. It would also be possible to choose a position Po11, i.e. lying on the bracelet.

In FIG. 14 the carrier element is below the glass 22 and is fixed laterally extending beyond the same in a position Pu12 with two straps 8 on either side of the glass as the fixing device. This leads to relatively large, open antenna radiating surfaces FAO not covered by the glass 22.

If in the example of FIG. 13 a compact metal bracelet is used, sufficiently large, open antenna surfaces PAO are also obtained, as is indicated in hatched form.

Figure 15:
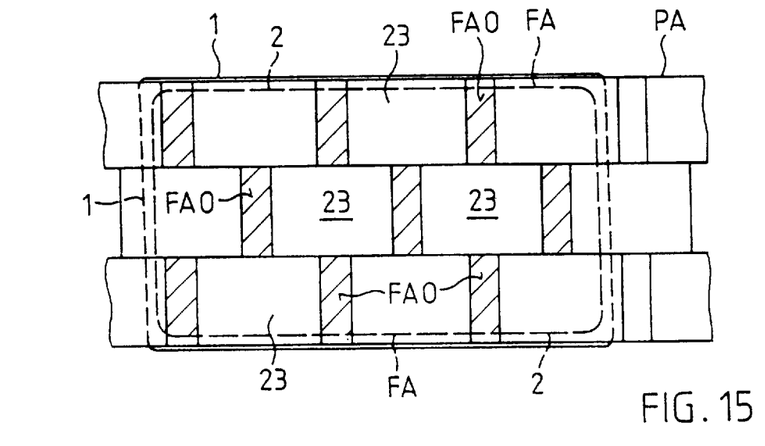
FIG. 15 An identification carrier under a metal element bracelet with open antenna radiating surfaces.

According to the example of FIG. 15 even a small proportion of open antenna surfaces FAO are sufficient, which are not covered by electromagnetically impermeable material or by electrically conductive parts. It is e.g. sufficient to have 10 to 20% of the entire antenna FA for making the communication with a reading station. The example shows a bracelet with metal elements or links 23 between which the areas FAO remain open. The open antenna radiating surfaces are preferably at least 0.5 cm$^2$.

With the inventive concept with the separate carrier element 1 it is possible to significantly extend the use areas and functions. The data carrier MI can be equipped with a writable memory 41 and can contain additional functions 42 such as credit/debit card functions, as well as additional personal coding functions 43, such as PIN codes or biometric data codes, as indicated in FIGS. 3b and 12. The coded communication 20 then takes place with correspondingly equipped read and write stations, as is known per se.

We claim:

1. Contactless identification carrier, carried by a person and having access functions for certain areas, particularly for skiing areas, characterized in that the identification carrier is constructed as a separate, flat carrier element (1), which is portably and interchangeably fixed to a personal bracelet PA and in which the carrier element (1) has a passive, integrated electronic data carrier MI with processor, electric circuit and memory, as well as an integrated antenna (2) and has a detachable fixing device (3), which allows a replacement of the personal bracelet PA and in which the antenna is surrounded by a dielectric (4) and has at least partly open radiating surfaces FAO, which are not covered by electrically conductive parts of the personal bracelet PA.

2. Identification carrier according to claim 1, characterized in that the carrier element (1) is flexible and slightly curved.

3. Identification carrier according to claim 1, characterized by a large-area, flat antenna loop (16), which on either side has a dielectric cover (4) with a thickness D1 of in each case at least 0.5 mm, e.g. 0.5 to 1 mm.

4. Identification carrier according to claim 1, characterized in that the open antenna radiating surfaces FAO are at least 0.5 cm$^2$.

5. Identification carrier according to claim 1, characterized in that the personal bracelet PA is a wristwatch (21) and the carrier element (1) can be so fixed below the wristwatch that there are open antenna radiating surfaces FAO, which are not covered by the surface of the glass (22).

6. Identification carrier according to claim 1, characterized in that the carrier element (1) can be fixed in different wearing positions on (Po), under (Pu) or laterally (Ps) alongside the personal bracelet PA.

7. Identification carrier according to claim 1, characterized in that the fixing device (3) is operable with one hand.

8. Identification carrier according to claim 1, characterized in that the length of the fixing device (3) is adjustable (DL) and consequently the cross-sectional circumference U of the personal bracelet is adaptable.

9. Identification carrier according to claim 1, characterized in that the fixing device (3) is made from plastic and has a positive fastening (14).

10. Identification carrier according to claim 1, characterized in that the carrier element with the fixing device (3) forms a flat clip (13) with a fastening surrounding the personal bracelet.

11. Identification carrier according to claim 1, characterized in that the fixing device has straps (8) with facing, interconnectable ends (8a, 8b).

12. Identification carrier according to claim 1, characterized in that the fixing device (3) has a snap-action fastening (14).

13. Identification carrier according to claim 1, characterized in that the fixing device (3) has a Velcro fastening (15).

14. Identification carrier according to claim 1, characterized in that the carrier element (1) and fixing device (3) are constructed as two separable and firmly joinable parts (1a, 3b).

15. Identification carrier according to claim 14, characterized in that the carrier element (1a) and fixing device (3b) are joinable in two directions (X1, X2) perpendicular to one another and in which the length L of the carrier element is 1.2 to 1.5 times its width B.

16. Identification carrier according to claim 1, characterized in that the antenna (2) is constructed as a flat ferrite (17) with an electrical winding, the ferrite axis (18) being parallel to the forearm axis (12).

17. Identification carrier according to claim 1, characterized in that the carrier element (1) and/or the fixing device (3) are transparent (29).

18. Identification carrier according to claim 1, characterized in that the data carrier MI contains a writable memory part (41) and that it has additional functions (42) such as credit/debit card functions.

19. Identification carrier according to claim 18, characterized in that the data carrier MI contains an additional personal coding function (43) such as a PIN code or biometric data code.

* * * * *